United States Patent [19]

Koppelman et al.

[11] Patent Number: 4,650,521
[45] Date of Patent: Mar. 17, 1987

[54] PROCESSING OF KAOLINITIC CLAYS AT HIGH SOLIDS UNDER ACIDIC CONDITIONS

[75] Inventors: Mitchell H. Koppelman, North Plainfield; Ingrid K. Migliorini, Linden, both of N.J.

[73] Assignee: Georgia Kaolin Company, Inc., Union, N.J.

[21] Appl. No.: 734,939

[22] Filed: May 16, 1985

Related U.S. Application Data

[63] Continuation of Ser. No. 513,888, Jul. 14, 1983, abandoned.

[51] Int. Cl.⁴ .............................................. C04B 14/00
[52] U.S. Cl. .................................. 106/309; 106/288 B; 106/308 B; 501/147
[58] Field of Search ................ 106/288 B, 308 B, 309; 501/146, 147

[56] References Cited

U.S. PATENT DOCUMENTS 3,546,066 12/1970 Ware et al. ............................ 106/214
4,186,027 1/1980 Beu et al. .......................... 106/288 B
4,309,222 1/1982 Hoyt ................................ 106/288 B Primary Examiner—Lorenzo B. Hayes
Attorney, Agent, or Firm—William W. Habelt

[57] ABSTRACT

A process for beneficiating a crude kaolinitic clay mineral to produce a clay filler for use in papermaking to improve the brightness, the color characteristics and the light scattering efficiency of the paper product. The crude kaolin clay is blunged with water containing a dispersing agent consisting of a blend of from about 20% to about 50% by weight of a water-soluble carbonate, about 20% to about 50% by weight of a water-soluble polyacrylate, and from 0% to about 60% by weight of a water-soluble anionic phosphate, to form a high solids fluid aqueous clay suspension having an acidic pH. This clay suspension is then fractionated to reduce the percentage of particles therein larger than 45 microns to not more than 0.2% by weight. The fractionated clay suspension is treated with an alkaline leaching solution containing a reducing agent effective in converting ferric ions to ferrous ions. The treated clay suspension has a solids content of at least 65% by weight, a low grit content, an acid pH, and a brightness of at least 84, and is suitable without further dewatering for use as a clay filler in making paper.

15 Claims, 1 Drawing Figure

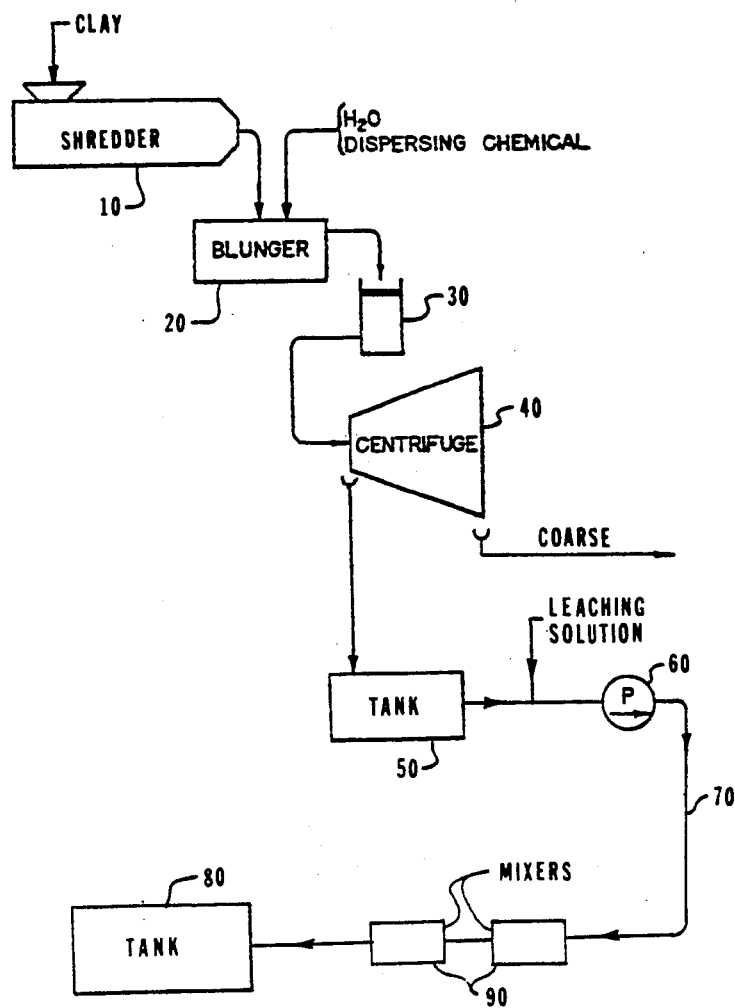

PROCESSING OF KAOLINITIC CLAYS AT HIGH SOLIDS UNDER ACIDIC CONDITIONS

This is a continuation of application Ser. No. 513,888 filed July 14, 1983, now abandoned.

BACKGROUND OF THE INVENTION

The present invention relates to the processing of clay minerals and, more particularly, is directed to the processing of kaolinitic clays at high solids under acidic conditions to produce an improved paper filler composition.

It is well known that the incorporation of clay-based filler compositions into the paper web during the formation of paper sheet can significantly improve the optical properties of the resultant paper sheet. This improvement in opacity of the paper sheet by means of incorporation of the clay filler is the result of increased light scattering due primarily to the difference in indices of refraction between the filler, the paper fiber and air, and also due to the increased number of light scattering voids formed in the paper web upon the incorporation of a clay filler. In order for the clay filler to perform well in improving opacity of the paper, the particle size distribution within the clay filler must be such that a large percentage of the clay particles have equivalent spherical diameters of between 0.6 and 1.5 microns and contain minimal particles with equivalent spherical diameters larger than 45 microns. Further, the paper maker must provide a paper product which meets customer specifications as to color shade. As it is customary to use dyes to obtain the desired paper color, the clay filler should have a consistent color, preferably showing good whiteness and little red, green, yellow or blue shade.

Unfortunately, very few kaolinitic clays in their crude state have the particle size distribution or the color characteristics which are required for a good paper filler composition. For example, although tertiary Kaolin clays mined in East Georgia have a fairly good particle size distribution in the crude state, they are usually highly colored. Additionally, their coloration varies widely ranging from grey-white to cream to brown to yellow to pink to purple. Accordingly, such East Georgia tertiary Kaolins are not, at present, widely used to make paper filler for white paper production.

Therefore, it has become customary in the industry to beneficiate the crude kaolinitic clays used in clay filler compositions for paper making to improve particle size distribution and also improve color characteristics by removing ferric iron-containing compounds in the clay. Such ferric iron-containing compounds impart a non-white color to the clay and reduce the overall brightness or reflectance to visible light of the clay. It is well known that the effect of these ferric iron-containing compounds may be reduced by treating the clay with a reducing agent which converts the ferric ion to the less highly colored ferrous ion. A variety of reducing agents are known to be suitable for treating kaolinitic clays, but the most commonly used reducing agents are water-soluble dithionites or sulphites, such as sodium dithionite, zinc dithionite, sodium bisulphite, sodium hydrosulphite, and sodium pyrosulphite.

In the conventional process for reducing the ferric iron-containing impurities in a kaolinitic clay to the ferrous state, a low solids aqueous suspension of the crude clay is first formed, then if desired, degritted to remove large particles, and then treated with a reducing agent to convert the ferric ions therein to the ferrous state. The ferrous ion is generally very soluble in water and will pass into the water in which the clay is suspended. The treated clay is then thickened, dewatered by filtration and the resultant filter cake thermally dried to produce a clay filler product having a high solids content, at least about 65%, suitable for economic transport. Such a low solid content process requires that the clay suspension be in a fluid state, that is, that the solids content of the crude clay suspension be less than about 50% by weight and usually in the range of 20% to 35% by weight. Unfortunately, such low solids processing of the crude kaolin requires that significant dewatering and drying be required to ready the treated clay product for economic transport. Significant economic benefits would be obtained if the crude kaolin clay could be processed at a high solids content, that is, at least about 65% by weight, so that the dewatering and subsequent drying of the treated clay could be minimized if not eliminated.

One such process for treating kaolinitic clays at high solids is disclosed in U.S. Pat. No. 4,186,027. As disclosed therein, a suspension of raw kaolinitic clay is formed in water at a solids content of 60% to 75% and at a pH in the range of from 7.0 to 11.0 with a dispersing agent. The fluid suspension of clay containing the dispersing agent is then treated with a water-soluble bleaching agent under alkaline pH conditions for a time sufficient to give the desired improvement and brightness of the clay. The treated clay product is said to not require any dewatering prior to shipment. This patent teaches that the suspensions must be prepared at a pH in the range of 7 to 11 in that suspensions outside of that range are allegedly too viscous to be refined successfully in a scroll-type centrifuge to give a product which is substantially free of particles having an equivalent spherical diameter larger than 10 microns. A drawback of such a high solids processing of the kaolinitic clay at an alkaline pH is that most of the papermaking processess used in the United States are carried out under acidic conditions. Therefore, it would be necessary to add additional acidic compounds in the papermaking process to neutralize an alkaline clay filler material produced from clay processing at a alkaline pH as disclosed in U.S. Pat. No. 4,186,027. Additionally, the clay filler material produced at an alkaline pH does not have good viscosity stability in that the viscosity of the clay filler produced in accordance with that process shows a significant increase in viscosity over time in storage. Further, beneficiation at an alkaline pH does not result in significant color improvement over the color characteristics of the crude.

In the present invention, it has been discovered that contrary to the teachings of U.S. Pat. No. 4,186,027, kaolinitic clays can be beneficiated at high solids, i.e. in excess of at least 65% by weight, under an acidic pH in the range of 5.5 to 7.0 to produce a paper filler product having improved brightness and color characteristics.

SUMMARY OF THE INVENTION

According to the present invention, there is provided a process for treating a crude kaolinitic clay mineral, particularly highly colored crude clay, under acidic conditions to provide a paper filler having improved brightness and reduced color. A fluid aqueous suspension of crude kaolinitic material is formed having a solids content of at least about 65% by weight and an acid pH in the range of 5.5 to 7.0 and containing a dispersing agent comprising from about 20% to about 50% by weight of a water-soluble carbonate, from about 20% to about 50% by weight of a water-soluble organic polyacrylate, and from 0% to about 60% by weight of a water-soluble anionic phosphate. After subjecting the suspension to a degritting process to reduce the percentage by weight of particles in the suspension larger than 45 microns to not more than 0.2% by weight, the degritted suspension is treated with an aqueous leaching solution containing a water-soluble reducing agent and having an alkaline pH for a sufficient time to increase the brightness and improve the coloration of the clay mineral therein. The suspension after treatment with the leaching solution has a solids content of at least about 65% by weight and is therefore suitable for economic transportation to customers for use as a clay filler in papermaking processes without dewatering and drying to increase solids content.

Preferably, the solids content of the aqueous clay suspension ranges from about 68% to about 75% by weight, and is most preferably in the range of about 70% to about 72% by weight. Further, it is preferred that the leaching solution has an alkaline pH of at least about 10. Preferably, the reducing agent is selected from the group consisting of sodium dithionite, sodium hydrosulphite, or mixtures thereof and the aqueous leaching solution containing same is formulated such that the level of treatment of the cla.y with reducing agent ranges from 1 to 6 pounds of reducing agent per ton of clay.

The preferred dispersing agents are sodium carbonate, sodium metaphosphate, and sodium polyacrylate having a weight average molecular weight of about 5,000 and a number average molecular weight of about 1,600. The aqueous clay suspension preferably contains the dispersing agent in an amount ranging from 6 to 20 pounds per ton of dry clay.

Further in accordance with the present invention, a clay filler composition for use in papermaking to enhance brightness is formed comprising a mixture of titanium dioxide, calcined kaolinitic clay, and a beneficiated kaolinitic clay slurry having a solids content of at least about 65%, the beneficiated kaolinitic clay slurry having been beneficiated by treatment of an aqueous suspension of crude kaolinitic mineral having a solids content of at least 65% and an acid pH ranging from 5.5 to 7.0 with an aqueous leaching solution containing a water-soluble reducing agent and having an alkaline pH.

BRIEF DESCRIPTION OF THE DRAWING

The sole FIGURE of drawing is a flow diagram illustrating the process of the present invention.

DESCRIPTION OF THE PREFERRED EMBODIMENTS

The present invention can perhaps be better understood with reference to the following examples and the discussion thereof presented hereinafter. These examples are to be regarded as illustrative, but not in any way limiting, of the present invention.

EXAMPLE 1A

An East Georgia tertiary kaolin clay, mined in Warren County, Ga., U.S.A., with an approximate moisture content of 20% was blunged with water containing a dispersing agent to form a 72% solids, based on dry weight, aqueous clay suspension at each of the following levels of addition of dispersing agent: 0.3, 0.4, 0.5, 0.6, 0.7 and 1.0% based on dry clay weight. The dispersing agent was a 50/50 blend of the dispersing chemicals sodium carbonate and a high molecular weight sodium polyacrylate. After mixing on a Talboys mixer at 2,000 rpm for approximately 18 hours, each of the six aqueous clay suspension were fractionated on an International centrifuge for 5 minutes at 1,000 rpm to remove coarse clay particles, i.e. particles having an equivalent spherical diameter (esd) greater than 45 microns. The solids content in each clay suspension was adjusted to 70.0% solids, based on dry weight, by the addition of water. Each clay suspension was then sub-divided into a control sample which was not further treated and another sample which was then treated with an aqueous leaching solution containing sodium dithionite as a reducing agent and having a pH of 10. The treatment level for all six clay suspensions was 4 pounds of sodium dithionite per ton of dry clay. Immediately after treatment with the reducing agent, sodium dithionite, the Brookfield viscosity was measured at 10 rpm and at 100 rpm. A portion of the control sample of each untreated clay suspension was passed through a 325 mesh screen to determine a residue percentage. Both the control sample and the treated sample of each clay suspension were covered and aged for one week. After the aging period, the Brookfield viscosity of both the control sample and the treated sample of each clay suspension was measured at 10 rpm and at 100 rpm both without any agitation and also after agitation by stirring for one minute on a Hamilton Beach mixer. Additionally brightness measurements were taken on both the control sample and the treated sample of each clay suspension. To prepare for these measurements, a 30 gram portion of each sample, based on dry weight, was removed and, after adjusting its pH to 4.5 with sulfuric acid, dried in a microwave oven for about 8 minutes and pulverized. The dried, pulverized clay was then pressed at 60 pounds in clay plaques upon which brightness measurements were taken with a Zeiss Electric Reflectance Photometer which measured reflectivity at a wavelength of 457 nm.

The results of the above mentioned measurements on both the control samples and the treated samples for each of six clay suspensions of Example 1A are recorded in Table 1A.

EXAMPLE 1B

Further clay suspensions of the East Georgia tertiary kaolin clay of Example 1A were prepared and treated in accordance with the procedures outlined in Example 1A except that a blend of 55% sodium metaphosphate, 20% sodium carbonate and 25% sodium polyacrylate was used as the dispersing agent rather than the 50/50 blend of sodium carbonate and sodium polyacrylate specified in Example 1A.

The same measurements recited in Example 1A were taken on the beneficiated clays of Example 1B. The results of these measurements on both the control samples and the treated samples of the six clay suspensions of Example 1B are recorded in Table 1B.

TABLE 1A

| Dispersant Level (%) | | Postcentrifugation % Solids | % + 325 Mesh Residue | Initial Viscosity | | pH Aged | Aged Viscosity | | | | Brightness |
|---|---|---|---|---|---|---|---|---|---|---|---|
| | | | | | | | WITHOUT AGITATION | | WITH AGITATION | | |
| | | | | 10 RPM | 100 RPM | | 10 RPM | 100 RPM | 10 RPM | 100 RPM | |
| 0.3 | Control | * | * | * | * | * | * | * | * | * | * |
| | Treated | | | | | * | * | * | * | * | * |
| 0.4 | Control | 71.7 | 4.290 | 25600 | 3360 | 8.18 | 23040 | 3192 | 16960 | 2304 | 82.4 |
| | Treated | | | | | 7.28 | 67200 | 11520 | 56000 | 8080 | 83.7 |
| 0.5 | Control | 71.6 | 0.706 | 960 | 280 | 8.93 | 2320 | 580 | 1120 | 296 | 84.0 |
| | Treated | | | | | 7.67 | 22800 | 4400 | 7800 | 1320 | 85.1 |
| 0.6 | Control | 70.9 | 0.356 | 1080 | 288 | 8.26 | 1880 | 500 | 1000 | 252 | 84.0 |
| | Treated | | | | | 8.14 | 8080 | 1216 | 2320 | 456 | 86.0 |
| 0.7 | Control | 71.8 | 1.028 | 1840 | 420 | 9.12 | 2800 | 672 | 1680 | 352 | 83.4 |
| | Treated | | | | | 8.18 | 16000 | 5700 | 2400 | 400 | 85.0 |
| 1.0 | Control | * | * | * | * | * | * | * | * | * | * |
| | Treated | | | | | * | * | * | * | * | * |

*unable to measure due to unmanageable viscosity; Brookfield viscosity measured using spindle #3 and recorded in centipoise.

TABLE 1B

| Dispersant Level (%) | | Postcentrifugation % Solids | % + 325 Mesh Residue | Initial Viscosity | | pH Aged | Aged Viscosity | | | | Brightness |
|---|---|---|---|---|---|---|---|---|---|---|---|
| | | | | | | | WITHOUT AGITATION | | WITH AGITATION | | |
| | | | | 10 RPM | 100 RPM | | 10 RPM | 100 RPM | 10 RPM | 100 RPM | |
| 0.3 | Control | 71.5 | 4.021 | 2120 | 470 | 5.94 | 5240 | 960 | 3960 | 728 | 82.6 |
| | Treated | | | | | * | * | * | * | * | * |
| 0.4 | Control | 71.8 | 0.043 | 480 | 144 | 6.37 | 1960 | 444 | 520 | 172 | 82.0 |
| | Treated | | | | | 5.59 | 94400 | 18080 | 62400 | 9120 | 85.7 |
| 0.5 | Control | 69.8 | 0.005 | 460 | 140 | 6.84 | 1240 | 340 | 400 | 150 | 81.2 |
| | Treated | | | | | 6.13 | 2840 | 662 | 2040 | 436 | 85.2 |
| 0.6 | Control | 71.4 | 0.011 | 480 | 132 | 6.99 | 960 | 268 | 440 | 140 | 81.1 |
| | Treated | | | | | 6.17 | 2160 | 468 | 1440 | 306 | 84.2 |
| 0.7 | Control | 71.6 | 0.066 | 1080 | 228 | 7.33 | 920 | 206 | 800 | 172 | 80.9 |
| | Treated | | | | | 6.60 | 2000 | 428 | 1360 | 276 | 84.3 |
| 1.0 | Control | 71.9 | 1.089 | 2720 | 472 | 7.73 | 2440 | 436 | 2360 | 412 | 79.9 |
| | Treated | | | | | 7.22 | 6240 | 1952 | 3040 | 576 | 82.6 |

*unable to measure due to unmanageable viscosity; Brookfield viscosity measured using spindle #3 and recorded in centipoise.

From Tables 1A and 1B, it can be seen that a quality beneficiated clay suspension of low viscosity, improved brightness and low grit content can be produced in accordance with the present invention at an acid pH utilizing a dispersing agent comprising from about 20% to about 50% by weight of a water-soluble carbonate, from about 20% to 50% by weight of a water-soluble organic polyacrylate, and from 0 to about 60% by weight of a water-soluble anionic phosphate.

As seen in Table 1A, a dispersion agent consisting of a 50/50 blend of sodium carbonate and sodium polyacrylate performed well when the level of addition of the dispersing agent into the clay was in the range from 0.5% to 0.7% by weight of dry clay. From Table 1B, it is seen that the range of levels of addition of dispersing agent into the clay which yielded a satisfactory clay product was increased when sodium metaphosphate was included as one of the dispersing chemicals in the dispersing agent. With the preferred dispersing agent consisting of 55% by weight of sodium metaphosphate, 20% by weight of sodium carbonate, and 25% by weight of sodium polyacrylate having a weight average molecular weight of about 5,000 and a number average molecular weight of about 1,600 as the dispersing agent, an acceptable clay product was produced over a range of levels of addition of dispersant into the clay from 0.3% to 1.0% by weight of dry clay with the best results being obtained at addition levels ranging from 0.4% to 0.7% by weight of dry clay. Therefore, using the preferred dispersing agent composition, the sensitivity to dispserant addition level is minimized. In the range of dispersant addition levels from 0.4% to 0.7%, the brightness of the beneficiated clay product was improved by 3 to 4 points.

EXAMPLE 2A

An East Georgia Tertiary kaolin clay, mined in Warren County, Ga., U.S.A., was blunged with water containing as a dispersing agent a blend of 55% sodium metaphosphate, 20% sodium carbonate and 25% sodium polyacrylate, to form a 72% solids, based on dry weight, aqueous clay suspension. The level of addition of dispersing agent was 0.5% based on a dry clay weight. After mixing on a Talboys mixer at 2,000 rpm for approximately 18 hours, the clay suspension was fractionated on an International centrifuge for 5 minutes at 1,000 rpm to remove clay particles having an equivalent spherical diameter (esdl greater than 45 microns, the solids content of the fractionated suspension was adjusted to 70% solids, based on dry weight. The fractionated suspension was then subdivided into six samples which were treated with at differing treatment levels with an aqueous leaching solution containing sodium dithionite as the reduing agent and having a pH adjusted to 10 with sodium hydroxide. The treatment levels used were 0, 1, 2, 4, 6 and 8 pounds of sodium dithionite per ton of dry clay. A pH reading was recorded before and after the leaching treatment and an initial Brookfield viscosity measurement was taken immediately after the leaching treatment for each sample. Each sample was then covered and allowed to age for one week. After the aging period, the Brookfield viscosity of each sample was measured at 10 rpm and at 100 rom both without any agitation and also after agitation by stirring for one minute on a Hamilton Beach mixer.

Brightness measurements were also taken on clay plaques made from each sample as outlined in Example 1A. Additionally, the color characteristics of each of the clay plaques was measured on a Gardner XL-20 Tristimulus colorimeter with the Hunter color values "L", "a" and "b" being determined, the value "L" representing the lightness index, the value "a" indicating the red or green shade, and the value "b" indicating the yellow or blue shade.

EXAMPLE 2B

A clay suspension of a different crude East Georgia tertiary kaolin clay, mined in McDuffie County, Ga., U.S.A. was prepared and then treated with a leaching solution in accordance with the procedures outlined in Example 2A. The same measurements recited in Example 2A were performed. The measurements taken in Examples 2A and 2B are recorded in Tables 2A and 2B, respectively.

weight, aqueous clay suspension. The level of addition of dispersing agent was 0.5% based on a dry clay weight. After mixing on a Talboys mixer at 2,000 rpm for approximately 18 hours, the clay suspension was fractionated on an International centrifuge for 5 minutes at 1,000 rpm to remove clay particles having an equivalent spherical diameter (esd) greater than 45 microns and the solids content of the fractionated suspensions were adjusted to 70% solids, based on dry weight. The fractionated suspension of each of the four clays were then subdivided into six samples which were treated at differing treatment levels with an aqueous leaching solution containing sodium dithionite as the reducing agent and having a pH adjusted to 10 with sodium hydroxide. The treatment levels used were 0, 3, 4, 5, 6 and 8 pounds of sodium dithionite per ton of dry clay. A pH reading was recorded before and after the leaching treatment and an initial Brookfield viscosity measurement was taken immediately after the leaching treat-

TABLE 2A

| Lbs./Ton Sodium Dithionite | pH Initial | Initial Viscosity 10 RPM | 100 RPM | pH Aged | Aged Viscosity WITHOUT AGITATION 10 RPM | 100 RPM | WITH AGITATION 10 RPM | 100 RPM | Brightness | L | a | b |
|---|---|---|---|---|---|---|---|---|---|---|---|---|
| 0 Lb/Ton | 6.83 | 400 | 131 | 7.02 | 1310 | 330 | 640 | 214 | 81.4 | 93.6 | +1.7 | +5.8 |
| 1 Lb/Ton | 6.83 | 450 | 121 | 6.81 | 1290 | 321 | 660 | 188 | 81.7 | 93.2 | +1.8 | +5.2 |
| 2 Lb/Ton | 6.84 | 420 | 130 | 6.65 | 1310 | 321 | 640 | 191 | 82.5 | 93.4 | +1.7 | +5.0 |
| 4 Lbs/Ton | 6.84 | 740 | 183 | 6.42 | 1900 | 421 | 1090 | 264 | 84.3 | 94.5 | +.3 | +5.0 |
| 6 Lbs/Ton | 6.85 | 1160 | 249 | 6.30 | 2450 | 431 | 1300 | 280 | — | — | — | — |
| 8 Lbs/Ton | 6.81 | 2100 | 435 | 6.35 | 80400 | 16400 | 94000 | 18200 | 86.7 | 95.5 | −.3 | +5.0 |

Brookfield viscosity measured using spindle #3 and recorded in centipoise.

TABLE 2B

| Lbs./Ton Sodium Dithionite | pH Initial | Initial Viscosity 10 RPM | 100 RPM | pH Aged | Aged Viscosity WITHOUT AGITATION 10 RPM | 100 RPM | WITH AGITATION 10 RPM | 100 RPM | Brightness | L | a | b |
|---|---|---|---|---|---|---|---|---|---|---|---|---|
| 0 Lb/Ton | 6.57 | 470 | 135 | 6.83 | 1200 | 314 | 410 | 156 | 82.1 | 93.7 | +1.3 | +5.4 |
| 1 Lb/Ton | 6.57 | 360 | 116 | 6.77 | 1190 | 315 | 400 | 144 | 82.4 | 93.6 | +1.4 | +5.3 |
| 2 Lb/Ton | 6.55 | 360 | 116 | 6.47 | 1240 | 318 | 490 | 141 | 82.5 | 93.7 | +1.4 | +4.9 |
| 4 Lbs/Ton | 6.56 | 660 | 160 | 6.41 | 1790 | 434 | 950 | 246 | 83.6 | 94.6 | +.7 | +5.2 |
| 6 Lbs/Ton | 6.55 | 1080 | 256 | 6.36 | 82400 | 19040 | 88800 | 19800 | 85.8 | 95.3 | −.3 | +5.0 |
| 8 Lbs/Ton | 6.55 | 2350 | 490 | * | 135600 | 26200 | * | * | * | * | * | * |

*unable to measure due to unamanageable viscosity; Brookfield viscosity measured using spindle #3 and recorded in centipoise.

As seen in Tables 2A and 2B for two different crude kaolins, a high quality clay product may be obtained from treating the acidic aqueous suspension of crude clay in accordance with the present invention with an aqueous leaching solution containing a water-soluble reducing agent and having a pH of at least about 10 at a treatment level ranging from 1 to 6 pounds of reducing agent per ton of dry clay. For both of the crude kaolin of Example 2, a significant improvement in brightness and color characteristics was obtained with the reducing agent sodium dithionite over a wide range of treatment levels. The preferred treatment level was found to lie in the range from 3 to 5 pounds of reducing agent per ton of dry clay. In this range, the brightness of both of the crude kaolins was increased and the color shading of the clay decreased.

EXAMPLE 3

Four different East Georgia tertiary koalin clay, mined in Warren County, Ga., U.S.A., each representing a different color shade, were blunged with water containing as a dispersing agent a blend of 55% sodium metaphosphate, 20% sodium carbonate and 25% sodium polyacrylate, to form a 72% solids, based on dry ment for each sample. Each sample was then covered and allowed to age for one week. After the aging period, the Brookfield viscosity of each sample was measured at 10 rpm and at 100 rpm both without any agitation and also after agitation by stirring for one minute on a Hamilton Beach mixer. Brightness measurements were also taken on clay plaques made from each sample as outlined in Example 1A. Additionally, the color characteristics of each of the clay plaques was measured as outlined in Example 2A.

The results of the above-mentioned measurements for each of the six suspensions of each of the four clays of Example 3 are recorded in Table 3.

The beneficiation procedures of the present invention can be successfully applied to a wide range of crude kaolins of distinctly different color and brightness. As illustrated in Table 3, by proper and judicious selection of the appropriate treatment level of leaching chemical, clays of distinctly different color and brightness can be processed to yield a quality clay suspension suitable for use in papermaking and having a low viscosity, improved brightness, low grit content and improved whiteness. Therefore, in accordance with the present invention, there is provided a process for beneficiating crude kaolinitic clays to produce clay suspensions of high solids content under acidic condition suitable for use as a paper filler which enable the use of highly colored crude clays previously labeled incapable of economic use in producing a low cost, high brightness filler clay due to their poor and variable color characteristics.

particle size distribution of only 0.058% greater than 325 mesh; a Brookfield viscosity at 10 rpm of 400 centripoise and at 100 rpm of 110 centipoise, and a Hercules viscosity of 1.2 dynes. The brightness of the clay suspension in holding tank 50, determined by acidification with sulfuric acid of a 30% solids slurry to a pH of 3 followed by filtration, pulverizing and pressing into a clay plaque as in Example 1A, was measured to be 83.5.

TABLE 3

| Crude | Apparent Color | % + 325 Residue | Lb/Ton Addition of Sodium Dithionite | Initial Viscosity After Treatment RPM 10 | 100 | pH (Aged) | Aged Viscosity Unagitated RPM 10 | 100 | Aged Viscosity Agitated RPM 10 | 100 | Brightness | L | a | b |
|---|---|---|---|---|---|---|---|---|---|---|---|---|---|---|
| I | Yellow | 0.0550 | 0 | 450 | 140 | 6.80 | 660 | 201 | 470 | 135 | 79.8 | 94.4 | +0.5 | +7.9 |
|   |   |   | 3 | 400 | 109 | 6.26 | 1050 | 309 | 440 | 118 | 82.1 | 94.4 | +0.3 | +6.7 |
|   |   |   | 4 | 510 | 130 | 6.20 | 1380 | 401 | 760 | 200 | 83.6 | 95.4 | +0.1 | +6.0 |
|   |   |   | 5 | 650 | 159 | 6.20 | 5380 | 1800 | 1980 | 458 | 84.5 | 95.3 | −0.1 | +5.7 |
|   |   |   | 6 | 1160 | 256 | * | * | * | * | * | * | * | * | * |
|   |   |   | 8 | 1960 | 456 | * | * | * | * | * | * | * | * | * |
| II | Brown | 0.0810 | 0 | 740 | 150 | 6.08 | 1690 | 432 | 710 | 206 | 81.3 | 94.5 | +0.9 | +6.6 |
|   |   |   | 3 | 510 | 145 | 6.00 | 2770 | 657 | 830 | 226 | 83.8 | 95.5 | +0.3 | +5.8 |
|   |   |   | 4 | 680 | 189 | 5.94 | 4960 | 1184 | 3400 | 620 | 85.4 | 95.5 | 0 | +5.5 |
|   |   |   | 5 | 1350 | 290 | 5.69 | 10000 | 4230 | 8600 | 2360 | 84.7 | 94.6 | 0 | +5.5 |
|   |   |   | 6 | 1520 | 371 | * | * | * | * | * | * | * | * | * |
|   |   |   | 8 | 4660 | 855 | * | * | * | * | * | * | * | * | * |
| III | Pink | .0024 | 0 | 470 | 135 | 6.83 | 1200 | 314 | 410 | 156 | 82.4 | 94.4 | +1.3 | +5.4 |
|   |   |   | 3 |   |   |   |   |   |   |   |   |   |   |   |
|   |   |   | 4 | 660 | 160 | 6.01 | 1790 | 434 | 950 | 246 | 83.6 | 95.3 | +0.7 | +5.2 |
|   |   |   | 5 |   |   |   |   |   |   |   |   |   |   |   |
|   |   |   | 6 | 1080 | 256 | 6.36 | 82400 | 19040 | 88800 | 19800 | 85.8 | 95.9 | −0.3 | +5.0 |
|   |   |   | 8 | 2350 | 490 | * | * | * | * | * | * | * | * | * |
| IV | Cream | .0078 | 0 | 590 | 158 | 6.72 | 1100 | 300 | 440 | 130 | 86.4 | +96.4 | −0.3 | +5.4 |
|   |   |   | 3 | 610 | 146 | 6.22 | 1160 | 312 | 540 | 141 | 87.3 | 96.3 | −0.3 | +4.2 |
|   |   |   | 4 | 660 | 143 | 6.08 | 1160 | 279 | 640 | 154 | 87.6 | 96.3 | −0.3 | +4.2 |
|   |   |   | 5 | 800 | 175 | 6.00 | 1340 | 325 | 850 | 191 | 87.4 | 96.1 | −0.3 | +4.2 |
|   |   |   | 6 | 810 | 175 | 5.91 | 1650 | 378 | 1000 | 245 | 87.5 | 96.0 | −0.3 | +4.2 |
|   |   |   | 8 | 2700 | 570 | 5.74 | 5400 | 2000 | 5400 | 1300 | 88.0 | 96.1 | −0.4 | +4.2 |

*unable to measure due to unmanageable viscosity; Brookfield viscosity measured using spindle #3 and recorded in centipoise.

EXAMPLE 4

To simulate the commercial beneficiation of crude Kaolinitic clays in accordance with the teachings of the present invention, two hundred and fifty tons of a pink shaded, East Georgia tertiary kaolin clay, mined in Warren County, Ga., U.S.A., was processed as illustrated in the drawing. The crude clay was passed to a shredder 10 wherein the clay was shredded to facilitate blunging. The shredded clay was then mixed with water and a dispersing agent in an impellor-type blunger 12 to produce a high solids aqueous suspension (approximately 75% solids by dry weight) of clay. The dispersing agent was a blend of dispersing chemicals consisting of 55% sodium metaphosphate, 20% sodium carbonate and 25% sodium polyacrylate having a weight average molecular weight of about 5,000 and a number average molecular weight of about 1,600. The level of addition of dispersing agent in the water mixed with the clay was 0.5% by weight of dry clay. The clay suspension then passed from the blunger 20 through a plurality of ⅛ inch slots in the sides of the blunger bowl to the screening apparatus 30 wherein the clay suspension was passed through vibrating 80 mesh screens to remove very coarse particles. The screened clay suspension was then passed to a rotating bowl-type continuous centrifuge 40 at a rate of approximately 20 tons per hour to remove coarse particles having an equivalent spherical diameter in excess of 45 microns. The centrifuged clay suspension was then collected in holding tank 50 prior to leaching to remove ferric ions therefrom. The centrifugal suspension in holding tank 50 had a solids content of 69.1% by weight, a pH of 6.9; a The clay suspension in holding tank 50 was pumped out by centrifugal pump 60 through conduit 70 at rate of 63 tons/hour to collecting tank 80. A leaching solution was introduced into the clay suspension on the suction side of pump 60 to leach the clay of ferric ions as the clay suspension passed through the conduit 70 to the collecting tank 80. Initial mixing of the leaching solution with the clay suspension was achieved through the action of the pump 60. Additional mixing was provided as the clay suspension passed through two in-line mixers 90 disposed in series in the conduit 70. The leached clay suspension was collected in collecting tank 80. The leaching agent was introduced into the clay slurry on the suction side of the pump 60 at a rate of 4 gallons/minute. The leaching solution was a commercial grade sodium hydrosulphite solution having a pH of 10+ and a concentration of about 1 pound of sodium hydrosulphite per gallon of water. The beneficiated clay suspension in collecting tank 80 had a solids content of 68.6% by weight; a pH of 6.7; a particle size distribution of only 0.057% greater than 325 mesh; a Brookfield viscosity at 10 rpm of 1440 centipoise and at 100 rpm of 284 centipoise, a Hercules viscosity of 6.5 dynes, and a brightness of 87.4.

EXAMPLE 5

A clay suspension of a different crude East Georgia tertiary Kaolin clay, mined in Warren County, Ga., U.S.A., was prepared and beneficiated in accordance with the procedure outlined in Example 4. The clay suspension prior to leaching had a solids content of 70.4% by weight; a pH of 6.7; a particle size distribution of 4.29% greater than 325 mesh; a Brookfield viscosity at 10 rpm of 420 centripoise and at 100 rpm of 12 centipoise; a Hercules viscosity of 1.4 dynes and a Brightness of 82.3. The clay suspension after leaching had a solids content of 69.1% by weight; a pH of 6.5; a particle size distribution of 0.0417% greater than 325 mesh; a Brookfield viscosity at 10 rpm of 1180 centipoise and at 100 rpm of 200 centipoise; a Hercules viscosity of 4.0 dynes and a Brightness of 85.1. Additionally, the beneficiated clay suspension had Hunter color values of: L=96.0; a=+0.2; and b=+4.8, compared to the Hunter color values of the unleached clay suspension of: L=94.7; a=+0.8, and b=+5.2.

Examples 4 and 5 illustrate and simulate a commercial process for producing beneficiated clay suspension suitable for papermaking from different crude East Georgia tertiary kaolin clays. In each case, the crude clay was dispersed in a suspension and treated with a leaching agent in accordance with the present invention utilzing the commercial prototype system illustrated in the drawing. In each case, the beneficiated clay suspension had a high solids content, i.e. greater than by weight, an acid pH, a high brightness, i.e. in excess of 84, a fluid viscosity, and a low grit content, i.e. not more than 0.2% by weight of solid particles larger than 45 microns in equivalent spherical diameter.

To compare the clay suspensions beneficiated in accordance with the present invention to prior art clay suspensions used as fillers in paper manufacturing, and to illustrate the effectiveness of the clay suspensions beneficiated in accordance with the present invention, paper hand sheets were made using filler compositions commercially available as well as a filler composition produced utilizing the clay suspension of Example 5 beneficiated in accordance with the present invention. Four commerically available filler compositions, hereinafter referred to as prior art 1, 2, 3 and 4, were utilized to produce paper hand sheets indicative of the state of the art. Prior art 1 was a full fraction (mean particle size distribution of 55% less than 2 microns) water washed filler clay having a brightness in the range of 83 to 85. Prior art 2 was a full fraction (mean particle size distribiution of 55% less than 2 microns) water washed filler clay having a brightness ranging from 83 to 85 and produced by a different supplier than prior art 1. Prior art 3 was a fine particle size filler clay (mean particle size distribution of greater than 90% less than 2 microns) having a brightness ranging from 81 to 83. Prior art 4 was a fine particle size filler clay (mean particle size distribution of greater than 90% less than 2 microns) having a brightness ranging from 83 to 85.

The clay filler composition of the present invention for use in paper making to enhance brightness comprises a mixture of 22% titanium dioxide, 8% calcined clay (anhydrous kaolin), and 70% filler clay suspension having a solids content of at least 65% and beneficiated in accordance with the present invention by treatment of an aqueous suspension of crude kaolinitic mineral having a solids content of at least 65% and an acid pH ranging from about 5.5 to 7 with an aqueous leaching solution containing a water-soluble reducing agent and having an alkaline pH. For purposes of comparison with the prior art, the beneficiated clay suspension of Example 5 was utilized in forming the clay filler of the present invention.

To form the hand sheets, a pulp slurry was prepared of approximately 70 parts by weight of bleached hard wood pulp and approximately 30 parts by weight of bleached soft wood pulp. The pulp was beaten in a Valley beater at approximately 2% solids. Alum:rosin size (2:1 ratio) was added to the pulp slurry to produce a final pulp pH of 4.5. The bleached hard wood pulp equaled a Canadian standard freeness between 350–375, and the bleached soft wood pulp equaled Canadian standard freeness between 500–525. The pulp mixture had a brightness value of 85.

The hand sheets were made on a Williams standard sheet mold apparatus. The pulp slurry was prepared from the pulp mixture at approximately 0.5% solids. The clay filler was added to the pulp slurry while agitating at levels of 20%, 25.8%, and 31%, based on pulp weight, followed by 0.33% addition, based on total solids, of a high molecular weight anionic polymer retention aid. For each of the clay fillers being evaluated, samples of the three pulp slurry/clay filler mixtures were used to produce a 60-pound sheet. After the formation of the wet sheet, blotting paper was applied followed by a five minute light pressing to separate the sheet from the screen and to remove some water. A second five minute pressing was administered at 78.5 psi pressure to remove additional water. The hand sheets were then placed on a 200° F. dryer for six minutes obtaining sheets of approximately 5% moisture.

Each of the hand sheets were then evaluated for brightness, opacity, basis weight, ash content, and color characteristics. Brightness was determined with a Zeiss Electric Reflectance photometer which measured reflectivity at a wave length of 457 nm. Opacity was evaluated using a Technidyne BNL-2 opacimeter in accordance with the constant ratio method for measuring opacity specified by the TAPPI standards. The opacity is defined as the reflectance of a sample with a black backing divided by the reflectance of a sample with a white backing. The opacities for the various sheets were corrected to an equivalent basis weight using the Kubelka-Munk formulas for light scattering on the Judd charts.

Color characteristics of each of the hand sheets was measured on a Gardner XL-20 tristimulus colorimeter with the Hunter color values "L", "a" and "b" being determined, the value "L" representing the lightness index, the value "a" indicating the redness or greeness, and the value "b" indicating the yellowness or blueness.

The results of the above-mentioned measurements for each of the hand sheets formed from the five clay fillers mentioned above are recorded in Table 4 as a function of the actual amount of filler, on a percentage by weight basis, present in the hand sheets. The actual amount of filler present in the hand sheets was determined through ashing. The hand sheets were ashed in a muffle furnace at a temperature in the range of 950°–1000° C. for approximately 8 minutes. The ash values obtained were then corrected for filler water loss and inert material in the pulp.

TABLE 4

|  | % Filler | Opacity | Brightness | L | a | b |
|---|---|---|---|---|---|---|
| Present | 5 | 86.0 | 85.7 | +94.7 | −.3 | +5.0 |
| Invention | 10 | 90.0 | 86.3 | +95.0 | −.4 | +4.9 |
|  | 15 | 92.4 | 86.8 | +95.3 | −.4 | +4.7 |
| Prior | 5 | 85.6 | 86.0 | +94.8 | −.4 | +4.9 |
| Art 1 | 10 | 89.2 | 86.8 | +95.1 | −.5 | +4.7 |
|  | 15 | 91.7 | 87.2 | +95.3 | −.5 | +4.7 |
| Prior | 5 | 85.5 | 85.7 | +94.6 | −.3 | +5.0 |
| Art 2 | 10 | 89.2 | 86.3 | +94.9 | −.4 | +4.9 |

TABLE 4-continued

|  | % Filler | Opacity | Brightness | L | a | b |
|---|---|---|---|---|---|---|
|  | 15 | 91.7 | 86.7 | +95.1 | −.4 | +4.8 |
| Prior | 5 | 85.7 | 84.3 | +94.3 | −.4 | +5.5 |
| Art 3 | 10 | 89.3 | 84.1 | +94.4 | −.5 | +5.8 |
|  | 15 | 92.0 | 84.4 | +94.6 | −.5 | +6.0 |
| Prior | 5 | 86.3 | 84.9 | +94.6 | −.4 | +5.3 |
| Art 4 | 10 | 90.3 | 85.0 | +94.7 | −.5 | +5.5 |
|  | 15 | 92.4 | 85.2 | +94.7 | −.5 | +5.6 |
| Pulp Control | 0 | 81.7 | 85.0 | +94.3 | −1.0 | +5.1 |

As can be seen in Table 4, the clay filler of the present invention was as least as effective in increasing opacity, increasing brightness, and improving color characteristics of the pulp hand sheets as any of the four prior art clay fillers. The clay filler of the present invention performs at least as well in a typical offset papermaking process as the conventionally produced, more expensive, full fractionated, water-washed clays.

Accordingly, it has been illustrated that a crude kaolinitic clay mineral may be beneficiated at high solids content under acid conditions to yield a clay filler material which is suitable for use in the papermaking process to enhance brightness and improved color characteristics of the paper product. A clay filler produced in accordance with the present invention under acidic conditions at high solids would be more economical to produce and will result in a clay filler which is also acidic thereby reducing the cost of the papermaking process by minimizing the amount of acid must be added in the conventional papermaking process to neutralize alkaline clay fillers.

We claim:

1. A process for treating a crude kaolinitic clay mineral comprising:
   a. forming a fluid aqueous suspension of crude kaolinitic clay mineral, said suspension having a solids content of at least about 65% by weight and an acid pH of at least about 5.5, said suspension containing a dispersing agent comprising from about 20% to about 50% by weight of a water-soluble carbonate, from about 20% to about 50% by weight of a water-soluble orgainic polyarylate, and from 0% to about 60% by weight of a water-soluble anionic phosphate;
   b. subjecting said suspension to a degritting process to reduce the percentage by weight of the particles in said suspension larger than 45 microns to not more than 0.2% by weight; and
   c. treating said suspension having a solids content of at least about 65% by weight and an acid pH with an aqueous leaching solution containing a water-soluble reducing agent and having an alkaline pH for a time sufficient to increase the brightness and improve the coloration of the clay mineral therein, said suspension after treatment with said leaching solution having a solids content of at least about 65% by weight.

2. A process according to claim 1 wherein said suspension contains from about 68% to about 75% by weight of solids.

3. A process according to claim 2 wherein said suspension contains from about 70% to about 72% by weight of solids.

4. A process according to claim 1 wherein said leaching solution has an alkaline pH of at least about 10.

5. A process according to claim 1 wherein said suspension is treated with an aqueous leaching solution containing a reducing agent at a treatment level ranging from 1 to 8 pounds of reducing agent per ton of dry clay.

6. A process according to claim 1 wherein said suspension is treated with an aqueous leaching solution containing a reducing agent selected from the group consisting of sodium dithionite, sodium hydrosulphite, or mixtures thereof.

7. A process according to claim 1 wherein said suspension contains said dispersing agent in an amount ranging from 6 to 20 pounds per ton of dry clay.

8. A process according to claim 1 wherein said water-soluble carbonate is sodium carbonate.

9. A process according to claim 1 wherein said water-soluble anionic phosphate comprises sodium metaphosphate.

10. A process according to claim 1 wherein said water-soluble organic polyacrylate comprises a sodium polyacrylate having a weight average molecular weight of about 5,000 and a number average molecular weight of about 1,600.

11. A process for treating a crude kaolinitic clay mineral comprising:
   a. forming an aqueous dispersing solution comprising a dispersing agent dissolved in water, said dispersing agent comprising from about 20% to about 50% by weight of sodium carbonate, from about 20% to about 50% by weight of sodium polyacrylate having a weight average molecular weight of about 5,000 and a number average molecular weight of about 1,600, and from 0% to about 60% by weight of sodium metaphosphate, said dispersing solution having an acid pH of at least about 5.5;
   b. blunging crude kaolinitic clay mineral with said aqueous dispersing solution to form a fluid aqueous suspension of crude kaolinitic clay mineral having a solids content of at least about 65% by weight, the concentration of said dispersing agent in said dispersing solution being in an amount ranging from 8 to 14 pounds per ton of dry clay;
   c. centrifuging said clay suspension to produce a centrifuged clay suspension having an acidic pH, a solids content of at least about 65% by weight, and containing not more than 0.2% by weight of solid particles larger than 45 microns; and
   d. treating said centrifuged clay suspension with an aqueous leaching solution containing a water-soluble reducing agent and having a pH of at least about 10 at a treatment level of ranging from 3 to 5 pounds of reducing ageat per ton of dry clay for a time sufficient to increase the brightness and improve the coloration of the clay mineral therein, said clay suspension after treatment with said leaching solution having a solids content of at least about 65% by weight.

12. A process according to claim 11 wherein the step of treating said centrifuged clay suspension with an aqueous leaching solution as recited in step (d) further comprises:
   a. passing said centrifuged clay suspension to a holding tank;
   b. withdrawing said centrifuged clay suspension from the holding tank by pumping means and conveying said centrifuged clay suspension through a conduit to a collecting tank;

c. introducing said aqueous leaching solution into said centrifuged clay suspension withdrawn from the holding tank, said aqueous leaching solution being introduced into said centrifuged clay suspension upstereom of the pumping means whereby the pumping means serves to assist in mixing said aqueous leaching solution with said centrifuged clay suspension;

d. disposing mechanical mixing means within the conduit intermediate the pumping means and the collecting tank whereby further mixing of said aqueous leaching solution with said centrifuged clay suspension occurs; and e. collecting said leached and centrifuged clay suspension in the collecting tank at a solids content of at least about 65% by weight.

13. A process according to claim 12 wherein said aqueous leaching solution comprises a solution of sodium hydrosulphite in water having a concentration of about 1 pound of sodium hydrosulphite per gallon of water.

14. A clay filler compsotion for use in papermaking to enhance brightness comprising a mixture of titanium dioxide, calcined kaolinitic clay, and a beneficiated kaolinitic clay slurry having a solids content of at least about 65%, said beneficiated kaolinitic clay slurry having been beneficiated by treatment of an aqueous suspension of crude kaolinitic clay mineral having a solids content of at least about 65% and an acid pH of at least about 5.5 with an aqueous leaching solution containing a water-soluble reducing agent and having an alkaline pH.

15. A filler composition according to claim 14 wherein the beneficiated kaolinitic clay slurry is produced in accordance with the process recited in claim 12.

* * * * *